Figure 1:
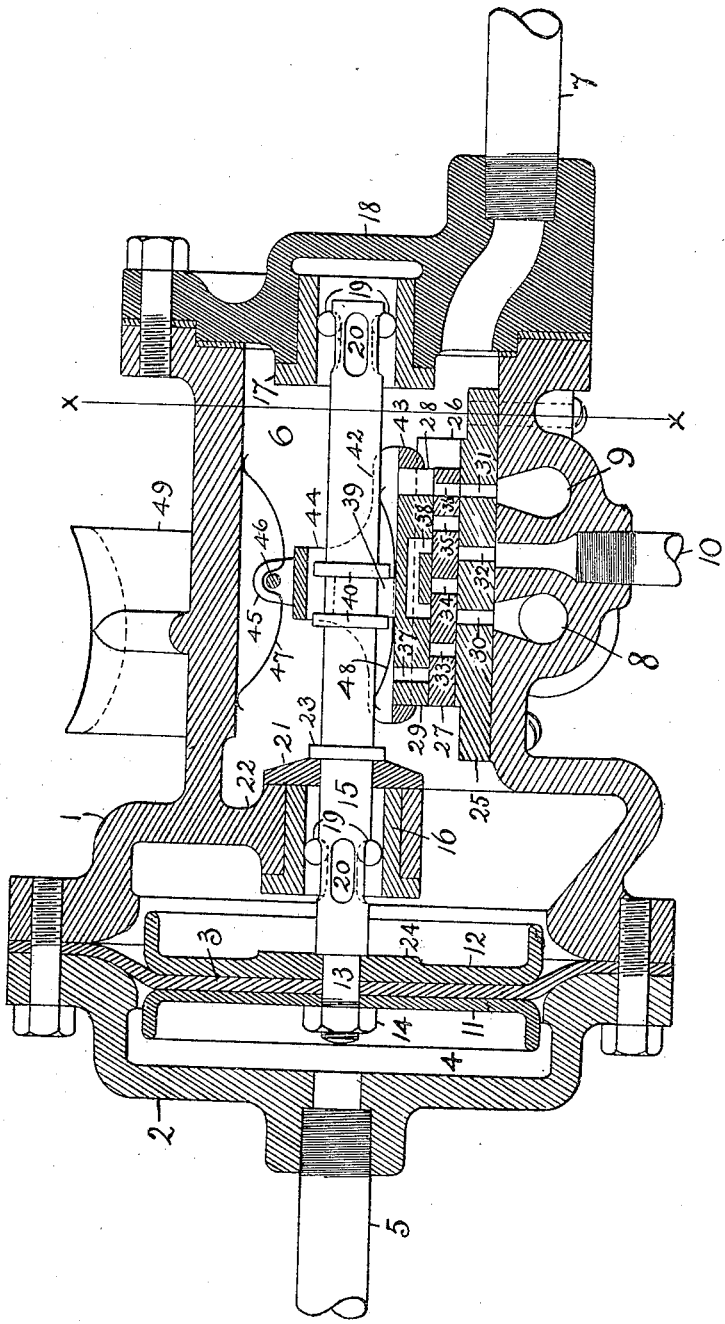

W. K. RANKIN.
BRAKE VALVE.
APPLICATION FILED MAY 11, 1909.

958,176.

Patented May 17, 1910.
2 SHEETS—SHEET 1.

Witnesses.
Oscar Winter
Henry F. Colvin

Inventor
Wm. K. Rankin.
By R. C. Wright
atty.

W. K. RANKIN.
BRAKE VALVE.
APPLICATION FILED MAY 11, 1909.
958,176.
Patented May 17, 1910.
2 SHEETS—SHEET 2.
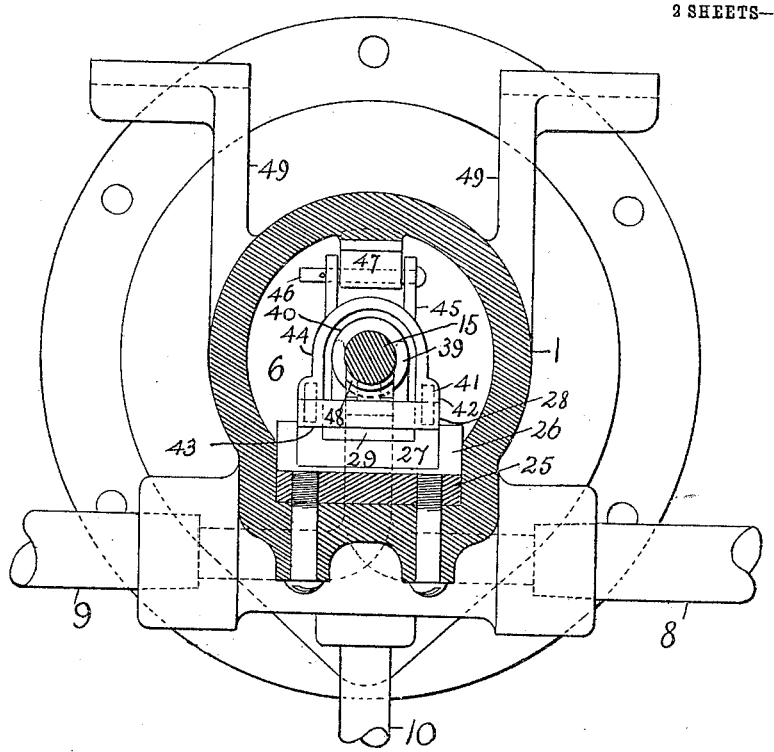
Fig. 2
Fig. 3
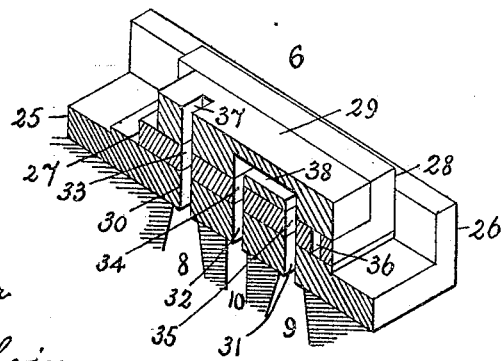
Witnesses.
Oscar Winter
Henry F. Colvin
Inventor.
Wm. K. Rankin.
By R C Wright
Atty.

UNITED STATES PATENT OFFICE.

WILLIAM K. RANKIN, OF PHILADELPHIA, PENNSYLVANIA, ASSIGNOR TO JOHN E. REYBURN, OF PHILADELPHIA, PENNSYLVANIA.

BRAKE-VALVE.

958,176. Specification of Letters Patent. Patented May 17, 1910.

Application filed May 11, 1909. Serial No. 495,274.

*To all whom it may concern:*

Be it known that I, WILLIAM K. RANKIN, a citizen of the United States, residing at Philadelphia, in the county of Philadelphia and State of Pennsylvania, have invented certain new and useful Improvements in Brake-Valves, of which the following is a specification.

The object of this invention is the construction of a brake valve in which the friction of the moving parts is reduced to a minimum, to insure very sensitive action, and is an improvement on my application filed Aug. 15, 1908, Number 448,694, allowed Feb. 3, 1909.

In the previous invention there is a piston, with packing rings, which, if set out enough to insure no leakage, are the means of creating too much friction, therefore I have eliminated the piston, and made other improvements, to insure sensitiveness of action, and whereby the brake application, and its release, are quickly effected, and have also simplified and cheapened the cost of construction.

The accompanying drawings, forming part of this application, illustrate the means employed, and in which similar parts are indicated by similar reference characters.

Figure 1 is a central vertical section with the parts in position for an emergency application. Fig. 2 is a cross section on line x x Fig. 1. Fig. 3 is central vertical section in isometrical perspective, of the valves in position for a full release.

There is a case 1 with a head or cover 2, and between them the edges of a diaphragm 3 are securely held, thus forming a chamber 4 with a train pipe connection 5 at one side of the diaphragm and a chamber 6 with an auxiliary reservoir connection 7 at the opposite side. The case also has a main reservoir connection 8, a brake cylinder connection 9, and an exhaust 10 open to the atmosphere. The central part of diaphragm 3 is supported between plates 11, 12 by the screw end 13 and nut 14 of stem 15 which operatively connects the diaphragm to the valves. A bushing 16 is supported within chamber 6 near the diaphragm, and another bushing 17 is supported in back head 18 and therein are ball bearings 19 which frictionlessly carry stem 15, the stem having seats 20 for the balls. The movement of diaphragm 3 is limited in one direction by an annular ring 21 between bushing 16 and its support 22 and collar 23 on rod 15, and oppositely limited by hub 24 on plate 12 abutting bushing 16. A removable valve seat 25, with guiding flanges 26 is secured at the bottom of chamber 6, and thereon and guided thereby is a valve 27, with guiding flanges 28 for a valve 29 mounted on and guided by valve 27 and its flanges 28. Seat 25 has ports 30, 31, 32 therethrough in communication with main reservoir connection 8, brake cylinder connection 9 and exhaust 10. Valve 27 has through ports 33, 34, 35, 36. Valve 29 has a through port 37 and an internal port 38, and upward projections 39 between collars 40 on rod 15. Attached to flanges 28 of valve 27 by pins 41 there is a yoke with longitudinal members 42 with overlapping ends 43 which transversely connect bars 42 at each end of valve 27, and are the means for moving the valve. The yoke has an upward extension 44 passing around stem 15, and thereon are ears 45 with a pin 46 carrying a spring 47 which at its ends bears against the top of chamber 6. Valve 29 also has a spring, 48 which has end bearings under stem 15.

49 is the means whereby case 1 is supported.

In operation, train pipe 5 is connected to an engineer's valve (not shown) which controls the operations of the triple valve, and as seen in Fig. 1, for an emergency application, the engineer's valve is operated to relieve diaphragm 3 from pressure in chamber 4, pressure then enters through pipe 7 from the auxiliary reservoir (not shown) and forces diaphragm 3 forward to its limit governed by the abutting of ring 21 against bushing 16; stem 15 attached to diaphragm 3 is carried forward and its collars 40 move valve 29 through its projections 39, while port 43 of the yoke, secured to valve 27, abuts the back end of the valve, moving it forward so that port 36 is uncovered to permit auxiliary reservoir pressure from pipe 7 and chamber 6 to flow through port 31, and brake cylinder connection 9. The position of the valves for a full release is seen in Fig. 3, where the positions of valves 27, 29 are shown when diaphragm 3, subjected to pressure in chamber 4 is moved back until the hub 24 abutting bushing 16, moving stem 15 and valves 27, 29 to put ports 37, 33 in communication with port 30 and allowing main reservoir pressure from connection 8 to pass through chamber 6 and connection 7 to recharge the auxiliary reservoir, and placing connection 9 of the brake cylinder in communication with exhaust 10 through ports 31, 35, 38, 34, 32. Springs 47, 48 insure the seating of their valves 27, 29. Graduated application and graduated release are accomplished by the manipulation of the engineer's valve to move diaphragm 3 in less degree than already described, to partially put the necessary ports in communication for applying or releasing the brakes.

I claim.

1. In a brake valve, a case, a diaphragm secured therein which divides the case and forms a train pipe chamber at one side, and an auxiliary reservoir chamber at the opposite side, a removable valve seat, a slide valve thereon, a second slide valve with a connection to the diaphragm, and with means to operate the valve located on the removable seat, and ball bearings for the diaphragm connection.

2. In a brake valve, a case, a diaphragm therein operative in one direction by train pipe pressure, and oppositely by auxiliary reservoir pressure, valves to control a brake, an operative connection from the diaphragm to the valves, and antifriction bearings for the connection.

3. In a brake valve, a case, connections therefrom to a main reservoir, a brake cylinder, the atmosphere and an auxiliary reservoir; a valve seat in the case, ports therethrough coinciding with the connections to a main reservoir, a brake cylinder and the atmosphere; a valve mounted and guided on the valve seat, and ports therethrough to connect with the valve seat ports and the interior of the case; a valve mounted and guided on the aforesaid valve with ports adapted to coact with the ports aforesaid; a diaphragm operative by fluid pressure, and means whereby the diaphragm controls the movement of the valves.

4. In a brake valve, a case having chambers with connections to different sources of pneumatic pressure; a diaphragm subject to opposite movements by the pressure in the chambers; a valve operative by a stem from the diaphragm antifriction supports for the stem; a valve operative by the aforesaid valve; connections from the case to pressure means for operating a brake; and ports in the valves for controlling the flow of the pressure.

5. In a brake valve, a case, a fluid pressure controlled diaphragm therein; a valve operative by the diaphragm; frictionless bearings for the operative means from the diaphragm to the valve; a second valve controlled by attachments on the diaphragm controlled valve and having a guiding seat; connections to the case for fluid pressure passage to brake operative devices, and ports in the valves aforesaid controlling the passing of the fluid pressure.

6. In a brake valve, a case and a diaphragm therein subject to movement in opposite directions by fluid pressure; connections from the case to brake operative devices and pressure reservoirs; valves adapted to control a brake by fluid pressure; a connection from the diaphragm to the first valve; a connection from the first valve to the second valve, and antifriction supports for the connection from the diaphragm to the first valve.

In testimony whereof I affix my signature in presence of two witnesses.

WILLIAM K. RANKIN.

Witnesses:
R. C. WRIGHT,
WILLIAM C. STOEVER.